(12) United States Patent
George et al.

(10) Patent No.: US 8,579,060 B2
(45) Date of Patent: Nov. 12, 2013

(54) DOUBLE HEAT EXCHANGER RADIATOR ASSEMBLY

(75) Inventors: Joseph M. George, Perry, MI (US); Scott R. Cooper, Holt, MI (US)

(73) Assignee: Demmer Corporation, Lansing, MI (US)

( * ) Notice: Subject to any disclaimer, the term of this patent is extended or adjusted under 35 U.S.C. 154(b) by 252 days.

(21) Appl. No.: 12/930,635

(22) Filed: Jan. 12, 2011

(65) Prior Publication Data

US 2011/0168470 A1 Jul. 14, 2011

Related U.S. Application Data

(60) Provisional application No. 61/335,880, filed on Jan. 13, 2010.

(51) Int. Cl.
*B60K 11/02* (2006.01)

(52) U.S. Cl.
CPC ..................................... *B60K 11/02* (2013.01)
USPC ........................................ 180/68.4; 180/68.1

(58) Field of Classification Search
CPC ........................................................ B60K 11/08
USPC .................. 180/68.1; 62/241; 165/41, 42, 44
See application file for complete search history.

(56) References Cited

U.S. PATENT DOCUMENTS

| | | | |
|---|---|---|---|
| 4,209,993 A * | 7/1980 | Rannenberg ...................... | 62/80 |
| 4,385,594 A | 5/1983 | Hauser, Jr. | |
| RE32,100 E * | 4/1986 | Rannenberg ...................... | 62/80 |
| 5,649,587 A | 7/1997 | Plant | |
| 6,155,335 A | 12/2000 | Acre et al. | |
| 6,189,603 B1 | 2/2001 | Sugimoto et al. | |
| 6,237,676 B1 * | 5/2001 | Hasegawa et al. .............. | 165/67 |
| 6,354,096 B1 | 3/2002 | Siler et al. | |
| 6,408,939 B1 | 6/2002 | Sugimoto et al. | |
| 6,561,264 B2 * | 5/2003 | Ozaki et al. .................... | 165/140 |
| 6,748,759 B2 * | 6/2004 | Wu .................................. | 62/305 |
| 6,840,743 B2 | 1/2005 | Herke et al. | |
| 6,951,240 B2 | 10/2005 | Kolb | |
| 7,142,424 B2 * | 11/2006 | Malone et al. ................. | 361/697 |
| 7,188,664 B2 | 3/2007 | Fuller et al. | |
| 7,399,157 B2 | 7/2008 | Tonhaeuser et al. | |
| 7,406,835 B2 | 8/2008 | Allen et al. | |
| 7,533,636 B2 | 5/2009 | Marsh et al. | |
| 7,640,966 B2 * | 1/2010 | Maeda et al. .................... | 165/41 |
| 2006/0005941 A1 * | 1/2006 | Watanabe et al. ............... | 165/41 |
| 2008/0078537 A1 * | 4/2008 | Desai ............................. | 165/140 |
| 2009/0211543 A1 * | 8/2009 | Rasmussen ................. | 123/41.56 |

(Continued)

*Primary Examiner* — John R Olszewski
*Assistant Examiner* — Jacob Meyer
(74) *Attorney, Agent, or Firm* — Butzel Long

(57) ABSTRACT

The disclosure generally relates to a heat exchanger apparatus having first and second heat exchangers arranged in a parallel configuration to receive a first fluid (e.g., a hot fluid) to be subjected to a heat exchange operation (e.g., cooling of the hot fluid). The first and second heat exchangers are further configured in a series configuration with respect to the flow of a second fluid to be used as a heat exchange medium (e.g., a cold fluid to be heated by the first, hot fluid). The heat exchanger apparatus can be used as a radiator (e.g., engine coolant heat exchanger) for a motorized vehicle, in particular a heavy vehicle intended for use in relatively hot ambient environments (e.g., an armored fighting vehicle adapted for desert use at ambient temperatures above about 100° F.). The disclosure also relates to methods of using the heat exchanger apparatus, for example in the motorized vehicle setting.

25 Claims, 7 Drawing Sheets

(56) References Cited

U.S. PATENT DOCUMENTS

| | | | |
|---|---|---|---|
| 2010/0051228 A1* | 3/2010 | Han | 165/41 |
| 2010/0186442 A1* | 7/2010 | Park | 62/510 |
| 2010/0226073 A1* | 9/2010 | Nicolai et al. | 361/678 |
| 2010/0236263 A1* | 9/2010 | Park | 62/113 |
| 2011/0088885 A1* | 4/2011 | Samuelson et al. | 165/176 |
| 2011/0132583 A1* | 6/2011 | Vironneau et al. | 165/121 |
| 2011/0308270 A1* | 12/2011 | Maeng et al. | 62/335 |
| 2012/0011867 A1* | 1/2012 | Koons et al. | 62/115 |
| 2012/0023979 A1* | 2/2012 | Taylor et al. | 62/115 |

* cited by examiner

DOUBLE HEAT EXCHANGER RADIATOR ASSEMBLY

CROSS-REFERENCE TO RELATED APPLICATION

Priority is claimed to U.S. Provisional Application No. 61/335,880, filed Jan. 13, 2010, the disclosure of which is incorporated herein in its entirety.

BACKGROUND OF THE DISCLOSURE

1. Field of the Disclosure

The present disclosure relates to a heat exchanger apparatus having first and second heat exchangers arranged in a parallel configuration to receive a fluid to be subjected to a heat exchange operation with a serial heat transfer gas medium. The heat exchanger apparatus can be used as a radiator for a motorized vehicle, in particular a heavy vehicle intended for use in hot ambient environments.

2. Objects

An object of the disclosure is to provide a heat exchanger apparatus having a high specific cooling capacity that permits the use of hot ambient environmental air to maintain a vehicle engine below a critical engine overheating temperature, in particular within the limited spatial constraints yet high cooling demands imposed in the engine compartment of heavy vehicles such as armored fighting vehicles.

These and other objects may become increasing apparent by reference to the following description.

SUMMARY

The disclosure relates to a motorized vehicle (e.g., an armored fighting vehicle (AFV) such as a wheeled AFV) comprising: (a) a vehicle body having (i) a front end, (ii) a rear end, and (iii) an engine compartment disposed toward the front end; (b) a vehicle engine mounted in the engine compartment; (c) an engine cooling system mounted to the vehicle body (e.g., in the engine compartment) and in fluid communication with the vehicle engine (e.g., via external engine cooling jackets); (d) optionally, an air conditioning system mounted to the vehicle body (e.g., in the engine compartment); (e) a heat exchanger apparatus (e.g., according to any of the embodiments described herein) mounted in the engine compartment and located to receive an external convective cooling air flow when the motorized vehicle moves in a forward direction; wherein: (i) the first and second heat exchangers of the heat exchanger apparatus are in fluid communication with the engine cooling system (e.g., to receive hot engine coolant fluid via an inlet port and to return cooled engine coolant fluid via an outlet port to the engine cooling system); and (ii) the third heat exchanger of the heat exchanger apparatus, when present, is in fluid communication with the air conditioning system.

Various embodiments of the disclosed apparatus and vehicle are possible. The motorized vehicle can have a vehicle weight of at least 5,000 lb, for example weights of at least 7,000 lb, at least 10,000 lb, up to 15,000 lb, and/or up to 20,000 lb. The heat exchanger apparatus is capable of maintaining the vehicle engine at an engine temperature less than 250° F. (e.g., less than 195° F.) when external cooling air has an ambient temperature up to 130° F. (e.g., ranging from 100° F. to 130° F.), for example at a vehicle test weight of about 10,000 lb, a test speed of about 3 mph to 5 mph, and a test time of about 30 min. The heat exchanger apparatus in the vehicle can have a cooling capacity for engine coolant fluid ranging from about 100,000 BTU/hr to about 500,000 BTU/hr. The heat exchanger apparatus (either in the vehicle or another setting) can have a specific cooling capacity (e.g., for engine coolant fluid) ranging from about 200 BTU/(hr·in$^2$) to about 2,000 BTU/(hr·in$^2$) (e.g., at least 200, at least 300, at least 400, at least 500, up to 800, up to 1000, up to 2000, and/or about 600 BTU/(hr·in$^2$)) relative to a cross-sectional area available for cooling gas (e.g., air) flow and substantially perpendicular to the cooling gas flow direction during use.

The disclosure also relates to heat exchanger apparatus comprising: (a) a first heat exchanger for performing heat exchange between a fluid and a gas, the first heat exchanger comprising: (i) a plurality of first tubes through which the fluid can flow, (ii) a plurality of first fins disposed between adjacent first tubes, (iii) a first inlet header in fluid communication with the first tubes at first longitudinal ends of the first tubes, and (iv) a first outlet header in fluid communication with the first tubes at second longitudinal ends of the first tubes; (b) a second heat exchanger for performing heat exchange between the fluid and the gas, the second heat exchanger being mounted adjacent to the first heat exchanger and comprising: (i) a plurality of second tubes through which the fluid can flow, (ii) a plurality of second fins disposed between adjacent second tubes, (iii) a second inlet header in fluid communication with (A) the second tubes at first longitudinal ends of the second tubes and optionally (B) the first inlet header, and (iv) a second outlet header in fluid communication with (A) the second tubes at second longitudinal ends of the second tubes and optionally (B) the first outlet header; wherein: (i) the second heat exchanger is disposed on an upstream gas side of the first heat exchanger; and (ii) the first heat exchanger and the second heat exchanger are configured to permit a gas flow in a direction from (A) the second heat exchanger and over the second tubes and the second fins thereof to (B) the first heat exchanger and over the first tubes and the first fins thereof in use to provide heat exchange between the fluid and the gas (e.g., cooling of a hot fluid with the gas).

Various embodiments of the disclosed apparatus are possible. The heat exchanger apparatus can further comprise: a bypass conduit between the first inlet header and the second inlet header, the bypass conduit placing the first inlet header in fluid communication with the second inlet header, thereby (i) permitting a portion of the fluid in the first inlet header to enter the second inlet header and (ii) permitting a portion of the fluid in the first inlet header to enter the first tubes. Alternatively or additionally, the heat exchanger apparatus can further comprise: a fan assembly disposed on an upstream gas side of the first heat exchanger, the fan assembly being capable of delivering a gas flow in a direction from the second heat exchanger to the first heat exchanger and substantially perpendicular to a longitudinal direction defined by the first tubes and the second tubes; and, optionally, a third heat exchanger for performing heat exchange between a second fluid and the gas, the third heat exchanger being interposed between the second heat exchanger and the fan assembly.

In an embodiment, an interior wall of the first outlet header and an interior wall of the second outlet header together define an opening placing the first outlet header in fluid communication with the second outlet header, thereby permitting a portion of the fluid in the first outlet header to mix with a portion of the fluid in the second outlet header prior to exiting the apparatus. The second fins and the second tubes of the second heat exchanger can be substantially aligned with corresponding first fins and first tubes in the first heat exchanger. Additionally, (i) the first inlet header and the first outlet header can extend in a direction substantially perpendicular to a longitudinal direction defined by the first tubes; and (ii) the second inlet header and the second outlet header can extend in a direction substantially perpendicular to a longitudinal direction defined by the second tubes. More specifically, (i) the first inlet header can comprise an inlet port; (ii) the first outlet header can comprise an outlet port; and (iii) the inlet port and outlet port can be located at opposing ends of their respective headers, thereby permitting gravity-assisted flow of the fluid through the first and second heat exchangers.

In another embodiment, at least one of the first or second inlet or outlet headers comprises at least one internal baffle, the baffle partitioning the header into two or more portions that are internally isolated from each other but which remain in fluid communication via the opposing header and the intervening tubes, thereby creating a multi-pass fluid flow path through the tubes of the first or second heat exchanger. For example, (i) the first inlet header comprises a first inlet internal baffle that partitions the first inlet header into two portions that are internally isolated from each other but which remain in fluid communication via the first outlet header and the first tubes; (ii) the first outlet header comprises a first outlet internal baffle that partitions the first outlet header into two portions that are internally isolated from each other but which remain in fluid communication via the first inlet header and the first tubes; and (iii) the first inlet internal baffle and the first outlet internal baffle form a multi-pass flow path for the fluid flowing through the first tubes of the first heat exchanger. Thus, the second heat exchanger can have a single-pass flow path for the fluid flowing through the second tubes of the second heat exchanger (e.g., the second inlet and outlet headers are free from baffles that would form a multi-pass structure or otherwise create two completely separated portions or volumes within the total header volume) and/or the first heat exchanger can have a three-pass flow path for the fluid flowing through the first tubes of the first heat exchanger. For example, the three-pass flow path in the first heat exchanger can be formed by a configuration in which (i) the first inlet internal baffle partitions the first inlet header into a first inlet header portion and a second inlet header portion; (ii) the first outlet internal baffle partitions the first outlet header into a first outlet header portion and a second outlet header portion; (iii) the first inlet header portion is in fluid communication with the second inlet header portion via the first outlet header portion and the first tubes; and (iv) the first outlet header portion is in fluid communication with the second outlet header portion via the second inlet header portion and the first tubes.

The disclosure also relates to a method for exchanging heat between a fluid and a gas, the method comprising: (a) providing a heat exchanger apparatus according to any of described embodiments; (b) feeding a fluid at a first temperature to the first inlet header and/or the second inlet header, thereby causing fluid to flow through the first inlet header, second inlet header, first tubes, second tubes, first outlet header, and second outlet header; (c) delivering a gas flow in a direction from the second heat exchanger to the first heat exchanger and substantially perpendicular to a longitudinal direction defined by the first tubes and the second tubes, thereby exchanging heat between the gas and the fluid in the first tubes and second tubes; (d) recovering the fluid at a second temperature from the first outlet header and/or the second outlet header.

Various embodiments of the disclosed method are possible. For example, (i) the fluid can be an engine coolant fluid comprising water and a glycol (e.g., consisting of water and a glycol along with any optional engine coolant additives); (ii) the gas is air (e.g., ambient/environmental air); and (iii) the first temperature of the fluid is higher than the second temperature of the fluid. In a refinement of this embodiment, (i) the heat exchanger apparatus is mounted in an engine compartment of a vehicle, the vehicle comprising a vehicle engine mounted in the engine compartment and an engine cooling system in fluid communication with the vehicle engine; (ii) the first and second heat exchangers of the heat exchanger apparatus are in fluid communication with the engine cooling system; and (iii) part (d) of the heat exchange method further comprises cooling the vehicle engine with the fluid recovered at the second temperature (e.g., thereby raising the fluid temperature to the first temperature and recycling the fluid at the first temperature to the inlet headers of the heat exchanger apparatus).

All patents, patent applications, government publications, government regulations, and literature references cited in this specification are hereby incorporated herein by reference in their entirety. In case of conflict, the present description, including definitions, will control.

Additional features of the disclosure may become apparent to those skilled in the art from a review of the following detailed description, taken in conjunction with the examples, drawings, and appended claims, with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawing wherein.

Figure 1:
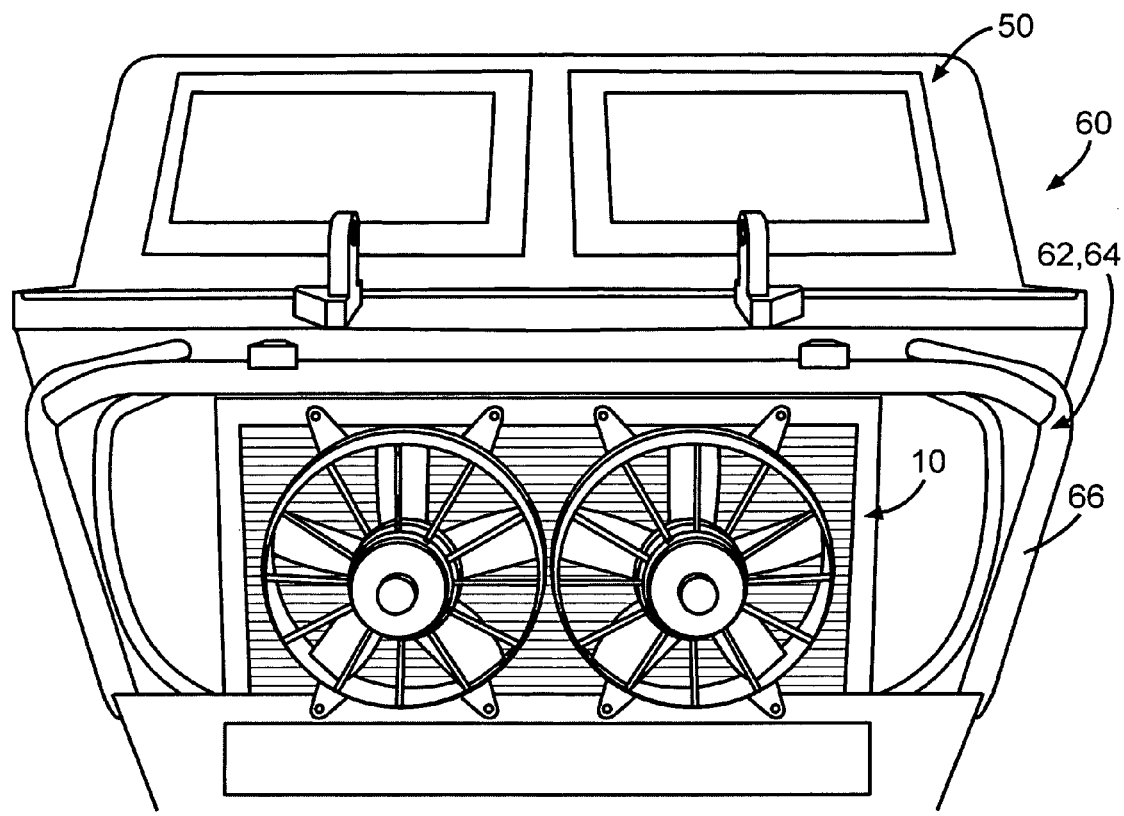
FIG. 1 illustrates a front view of a motorized vehicle incorporating a heat exchanger apparatus according to the disclosure into the front engine compartment of the vehicle.

While the disclosed apparatus and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

The present disclosure generally relates to a heat exchanger apparatus having first and second heat exchangers arranged in a parallel configuration to receive a first fluid (e.g., a hot fluid) to be subjected to a heat exchange operation (e.g., cooling of the hot fluid). The first and second heat exchangers are further configured in a series configuration with respect to the flow of a second fluid to be used as a heat exchange medium (e.g., a cold fluid such as a gas to be heated by the first, hot fluid). The heat exchanger apparatus can be used as a radiator (e.g., engine coolant heat exchanger) for a motorized vehicle, in particular a heavy vehicle intended for use in relatively hot ambient environments (e.g., an armored fighting vehicle adapted for desert use at ambient air temperatures above about 100° F.). The disclosure also relates to methods of using the heat exchanger apparatus, for example in the motorized vehicle setting.

Motorized Vehicle

Figure 2:
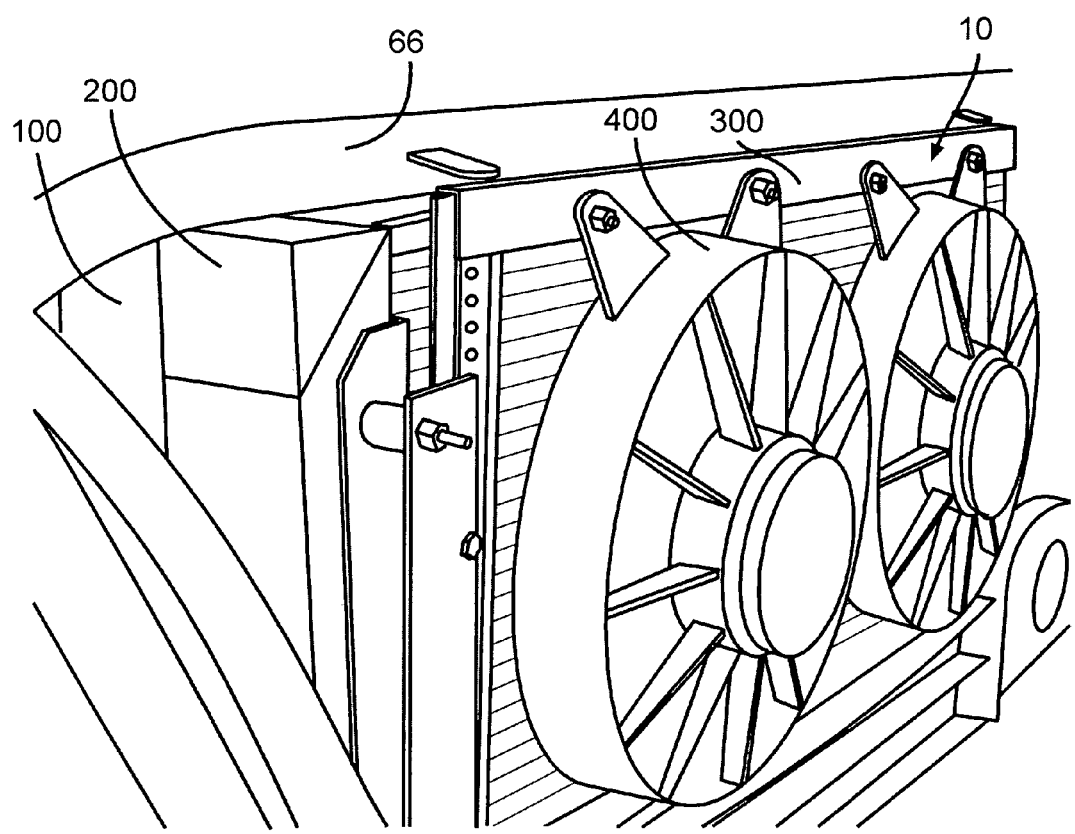
FIG. 2 illustrates a front perspective view of the heat exchanger apparatus of FIG. 1.
Figure 3:
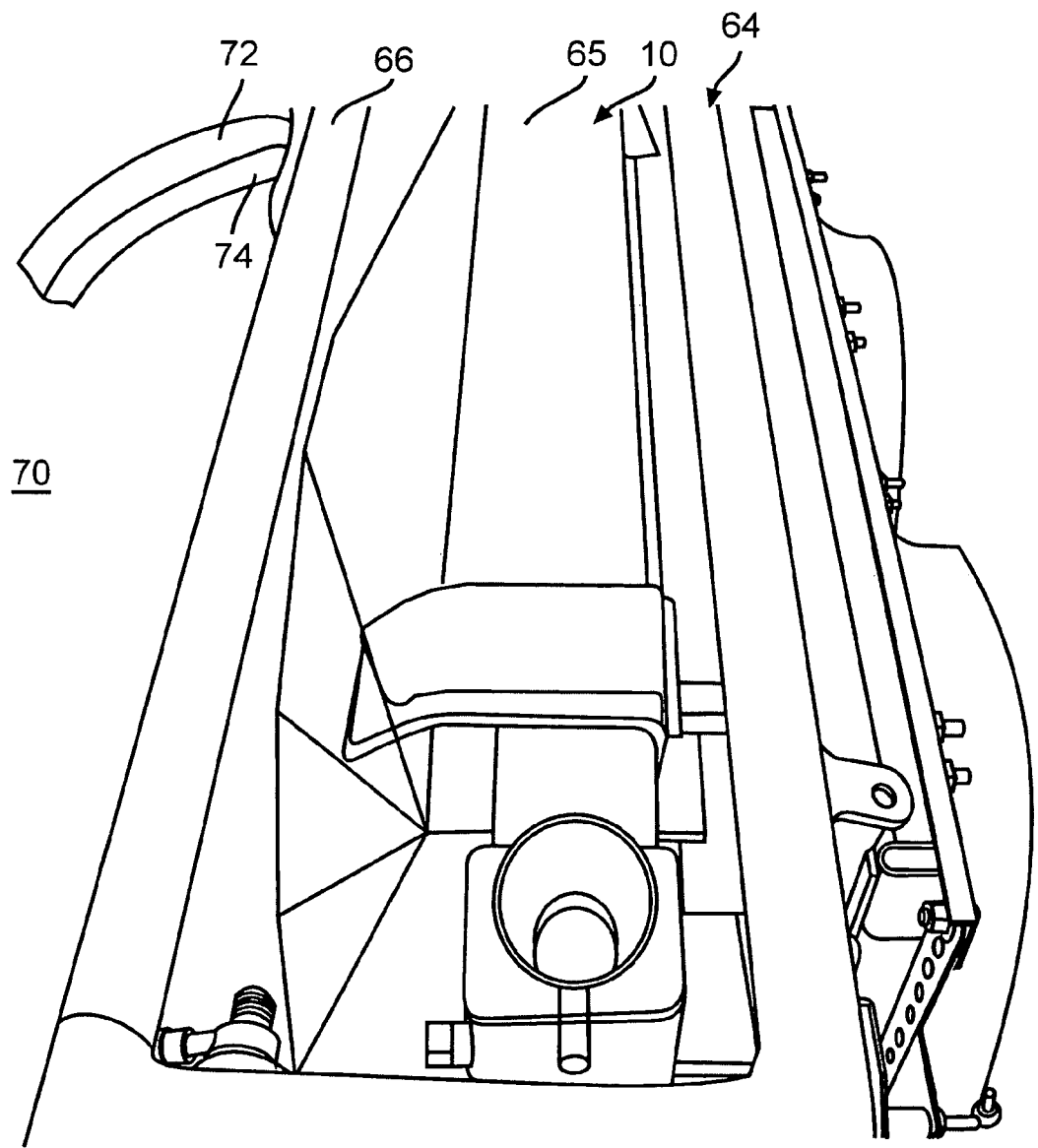
FIG. 3 illustrates a top angle view of the heat exchanger apparatus of FIG. 1 and related vehicle engine components mounted in the engine compartment behind the heat exchanger apparatus.
Figure 4:
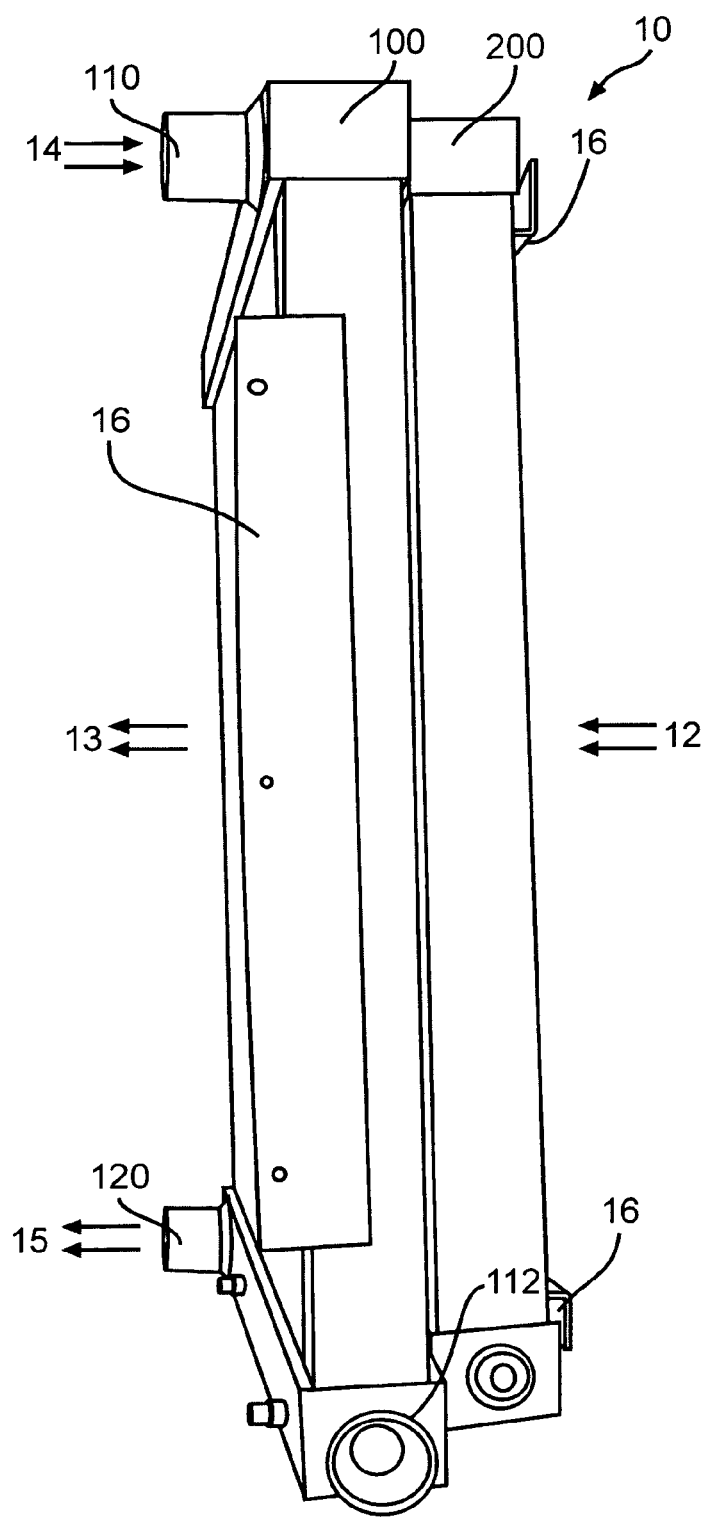
FIG. 4 illustrates a top view of the heat exchanger apparatus from FIG. 1 in isolation from the motorized vehicle.

FIGS. 1-3 illustrate a heat exchanger apparatus 10 according to the disclosure incorporated into a motorized vehicle 50. FIG. 4 illustrates the heat exchanger apparatus 10 removed from the vehicle 50.

The vehicle 50 has a structure substantially defined by a vehicle body 60 generally having (i) a front end 62, (ii) a rear end (i.e., an end in an opposite longitudinal direction from the front end 62; not seen in the figures), and (iii) an engine compartment 64 disposed toward the front end 62. The vehicle 50 is illustrated without body panels or an engine compartment cover (hood) that would generally be present during use. A frame 66 generally defines the engine compartment 64 and provides structure for mounting the heat exchanger apparatus 10 and other components in the engine compartment 64. As shown, the heat exchanger apparatus 10 is disposed toward the front end 62 to receive an external convective cooling air flow when the vehicle 50 moves in a forward direction (e.g., located directly behind a grill/grill opening (not shown) at the front end 62 of the vehicle body 60). The engine compartment 64 houses a vehicle engine typically mounted in a space behind the heat exchanger apparatus 10 (e.g., generally denoted by the numeral 70 as illustrated). The vehicle 50 further includes an engine cooling system 72 mounted to the vehicle body 60 (e.g., in the engine compartment 64 as generally shown in FIG. 3 with an engine coolant line 72). The engine cooling system 72 is in fluid communication with the vehicle engine 70 (e.g., to feed cooled engine cooling fluid to engine cooling jackets, not shown) and is in fluid communication with the heat exchanger apparatus 10 (e.g., to feed hot engine cooling fluid and receive cooled engine cooling fluid), for example including first and second heat exchangers 100, 200. The vehicle 50 can further include an air conditioning system 74 mounted to the vehicle body 60 (e.g., in the engine compartment 64 as generally shown in FIG. 3 with an air conditioning coolant line 74), for example to feed cooled air to a passenger compartment (not shown) of the vehicle 50. When present, the air conditioning system 74 is in fluid communication with a third exchanger 300 of the heat exchanger apparatus 10. As illustrated, the heat exchanger apparatus 10 further includes a shroud 65 (e.g., for armor plating) mounted on a downstream air side of the heat exchanger apparatus 10.

The vehicle 50 illustrated in FIGS. 1-3 is an armored fighting vehicle (AFV), more particularly a wheeled AFV. Vehicles 50 suitable for incorporation of the disclosed heat exchanger apparatus 10 are generally relatively heavy, for example based on their relatively large size and inclusion of components such as armor plating. The vehicle 50 can have a net vehicle weight of at least 5,000 lb (e.g., at least 7,000 lb, at least 10,000 lb) and/or up to 15,000 lb (e.g., up to 20,000 lb), including the weight of the vehicle 50 itself, its passengers, and its cargo (e.g., such as munitions or other military supplies, but not limited thereto). While illustrated in the context of a military AFV, the heat exchanger apparatus 10 can suitably be incorporated into any motorized vehicle having a high engine cooling demand based on the vehicle's net weight (including cargo) and/or the vehicle's use in relatively hot ambient environments.

Heat Exchanger Apparatus

The heat exchanger apparatus 10 is illustrated in detail in FIGS. 3-8. The heat exchanger apparatus 10 includes a first heat exchanger 100 and a second heat exchanger 200 for performing heat exchange between a first fluid 14 (e.g., hot engine cooling fluid) and a gas 12 (e.g., ambient air). The first fluid 14 is partitioned in the heat exchanger apparatus 10 (and/or upstream thereof) so that the fluid 14 flows in parallel through the first and second heat exchangers 100, 200 during use. The second heat exchanger 200 is mounted adjacent to the first heat exchanger 100, for example in contact with each other or (as shown) spaced apart from each other. Suitably, the first and second heat exchangers 100, 200 are in contact such that the space between the two units is substantially sealed and substantially all of the gas 12 passing through the second heat exchanger 200 also passes through the first heat exchanger 100 before exiting the apparatus 10. As illustrated, the heat exchanger apparatus 10 can further include mounting brackets 16 for mounting the heat exchanger apparatus 10 into its use setting (e.g., the vehicle engine compartment 64). The first and second heat exchangers 100, 200 are arranged in a series configuration such that the second heat exchanger 200 is disposed on an upstream gas side (e.g., illustrated by arrows in FIG. 4 showing the flow of the gas 12 into the heat exchanger apparatus 10) of the first heat exchanger 100. Suitably, the heat exchanger apparatus 10 further includes a fan assembly 400 disposed on an upstream air side of the first heat exchanger 100 (e.g., also on a upstream air side of the first heat exchanger 200). The heat exchanger apparatus 10 additionally can include a second fan assembly (not shown) on a downstream air side of the first heat exchanger 100 to increase the flow of the gas 12 through the heat exchanger apparatus 10. The fan assembly 400 is capable of delivering a gas flow (e.g., the gas 12, for example resulting from fan rotation rates of up to 5000 rpm) in a direction from the second heat exchanger 200 to the first heat exchanger 100 and substantially perpendicular to planes defined by the first and second heat exchangers 100, 200 (e.g., perpendicular to a longitudinal direction defined by first tubes and second tubes in the heat exchangers 100, 200 (described below), such as plane/surface A shown in FIG. 5). Additionally, the heat exchanger apparatus 10 can include a third heat exchanger 300 for performing heat exchange between a second fluid (e.g., hot refrigeration fluid from an air conditioning system) and the gas 12. As illustrated, the third heat exchanger 300 can be interposed between the second heat exchanger 200 and the fan assembly 400.

Figure 5:
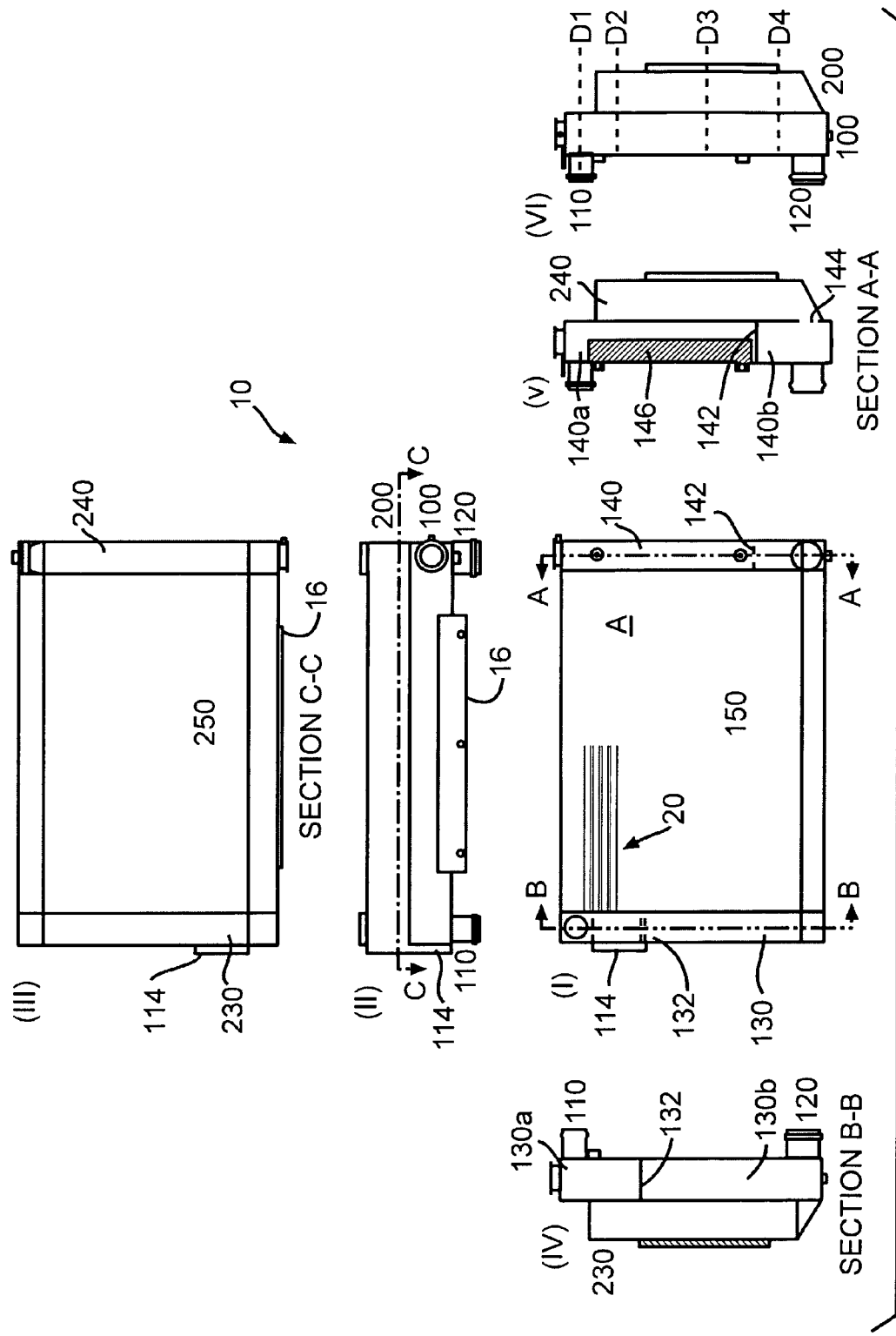
FIG. 5 illustrates a heat exchanger apparatus according to the disclosure, including front (I), top (II), back sectional (III), right side sectional (IV), left side sectional (V), and left side (VI) views.
Figure 6:
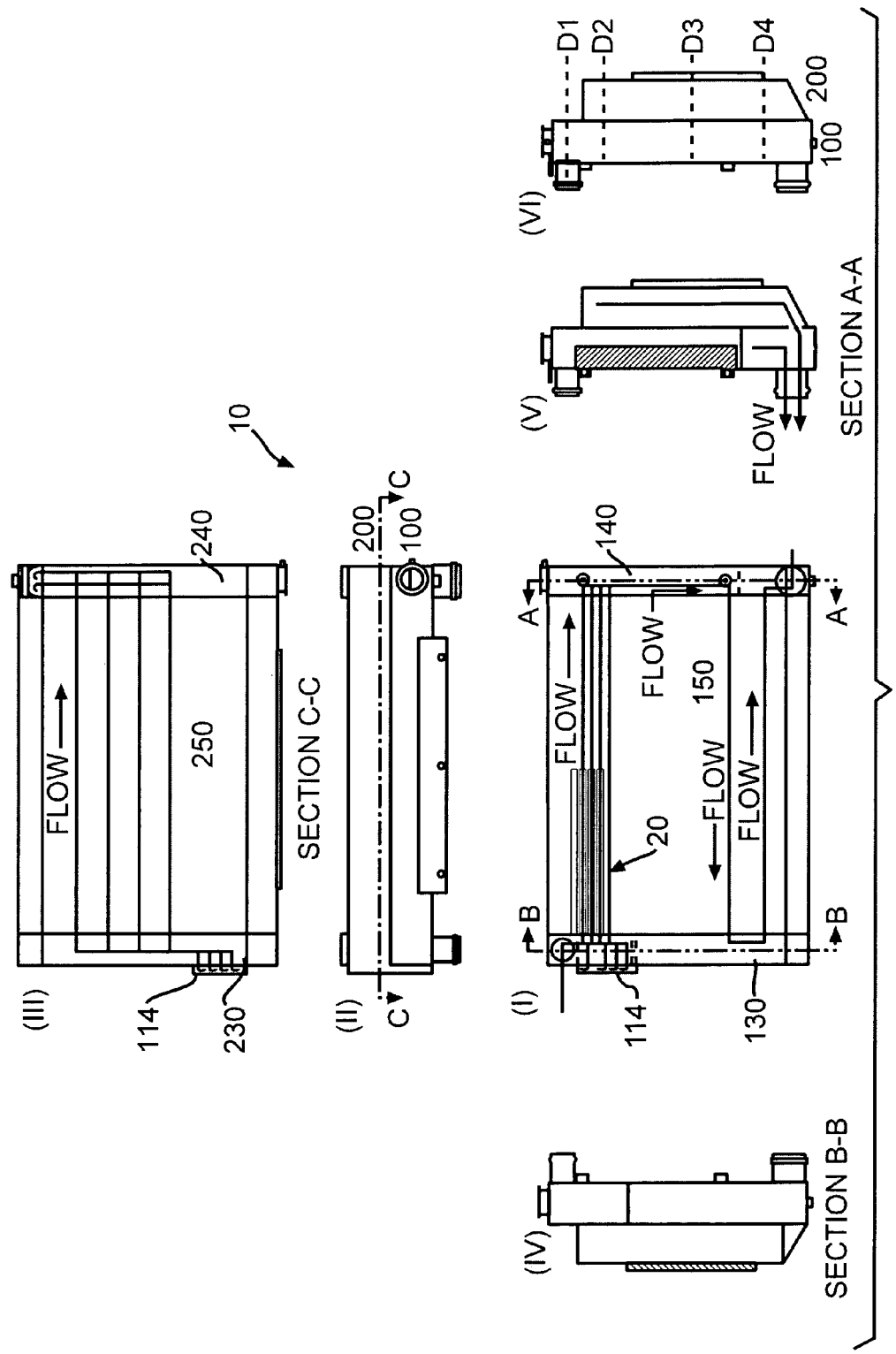
FIG. 6 illustrates the heat exchanger apparatus of FIG. 5 along with lines showing representative flow paths of fluid through the heat exchanger apparatus. (Lines/arrows indicate direction of fluid flow.)

FIG. 5 illustrates the structure of the first and second heat exchangers 100, 200 of the heat exchanger apparatus 10 in more detail. The first heat exchanger 100 includes a first heat transfer region 150 (e.g., through which the first fluid 14 can flow and exchange thermal energy with the gas 12), a first inlet header 130 in fluid communication with a first end (e.g., longitudinal end) of the heat transfer region 150, and a first outlet header 140 in fluid communication with a second end (e.g., longitudinal end opposite the first end) of the heat transfer region 150. Similarly, the second heat exchanger 200 includes a second heat transfer region 250 (e.g., through which the first fluid 14 can flow and exchange thermal energy with the gas 12), a second inlet header 230 in fluid communication with a first end (e.g., longitudinal end) of the heat transfer region 250, and a second outlet header 240 in fluid communication with a second end (e.g., longitudinal end opposite the first end) of the heat transfer region 250.

The headers 130, 140, 230, and 240 are fluid reservoirs that serve (i) to provide the fluid communication connections to and from the heat exchanger apparatus 10 (e.g., to the engine cooling system 72), (ii) to distribute fluid between the inlet headers 130, 230, (iii) to collect fluid from the outlet headers 140, 240, and (iv) to distribute/collect fluid to/from the heat transfer regions 150, 250. In the illustrated embodiment, the fluid 14 is partitioned/re-mixed in the headers 130, 140, 230, and 240; however, the partitioning/re-mixing of the fluid 14 to achieve parallel flow can be external to the heat exchanger apparatus 10 (e.g., with upstream and/or downstream valves/flow splitters in combination with additional inlets/outlets on the headers, in particular the second headers 230, 240).

For example, as illustrated, the heat exchanger apparatus 10 can include a bypass conduit 114 between the first inlet header 130 and the second inlet header 140. The bypass conduit 114 can be a fluid channel between openings in the inlet headers 130, 230 (e.g., at or near a top portion thereof and an inlet port 110). The bypass conduit 114 places the first inlet header 130 in fluid communication with the second inlet header 230, thereby permitting flow of the first fluid 14 between the two inlet headers. More specifically, the bypass conduit 114 distributes inlet fluid 14 between the heat exchangers 100, 200 by (i) permitting a portion of the fluid 14 in the first inlet header 130 to enter the second inlet header 230 and (ii) permitting a portion of the fluid 14 in the first inlet header 130 to enter the first heat transfer region 150. In another embodiment (not shown), when the inlet headers 130, 230 are in direct contact, the bypass conduit 114 can be omitted and fluid communication between the inlet headers 130, 230 can be achieved with an opening in an interior wall shared by the two headers.

Such an open-wall means of fluid communication is illustrated in FIG. 5 between the outlet headers 140, 240. An interior wall of the first outlet header 140 and an interior wall of the second outlet header 240 together define an opening 144 (e.g., near a bottom portion of the outlet headers and an outlet port 120) placing the first outlet header 140 in fluid communication with the second outlet header 240. The opening 144 permits at least a portion of fluid 15 (e.g., inlet fluid 14 that has been cooled in the apparatus 10) in the first outlet header 140 to mix with at least a portion of the fluid 15 in the second outlet header 240 prior to exiting the apparatus 10. In another embodiment (not shown), the outlet headers 140, 240 can be placed in fluid communication by means of a bypass conduit analogous to the bypass conduit 114.

Figure 7:
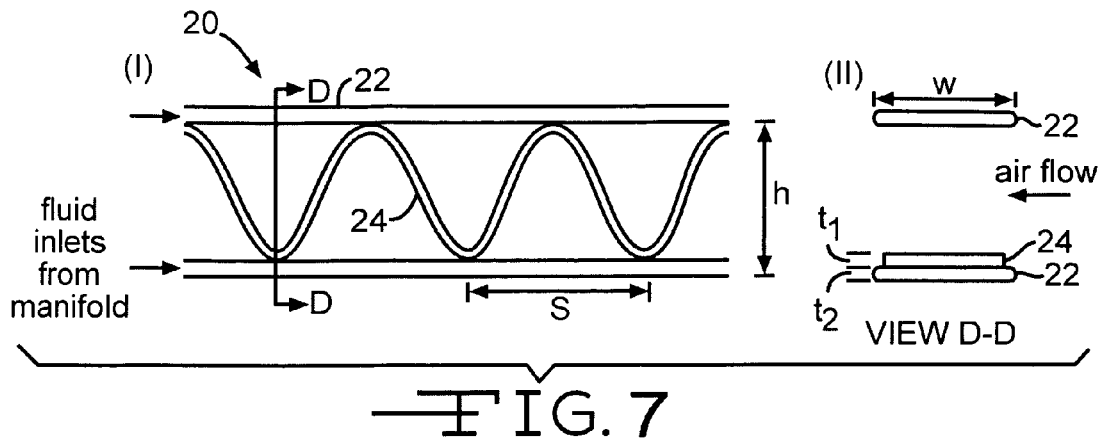
FIG. 7 illustrates cross-sectional views (I, II) of a representative cross-flow heat exchanger segment from the first and second heat exchangers of the heat exchanger apparatus of FIG. 5.

The first and second heat transfer regions 150, 250 can have similar internal detail structure illustrated in FIG. 7 as a cross-flow heat exchange segment 20. The heat exchange segment 20 is part of a network of tubes 22 through which the first fluid 14 can flow. The tubes 22 generally have a flat, rounded rectangular cross section and are separated with a tube spacing h (generally uniform spacing; e.g., 0.1 inch to 1 inch or about 0.33 inch) and a tube width w (e.g., 0.03 inch to 0.3 inch or about 0.09 inch). Corrugated cooling fins 24 (height h generally comparable to that of the tubes 22 (e.g., 0.1 inch to 1 inch or about 0.33 inch), spacing s (e.g., 0.05 inch to 0.5 inch or about 0.133 inch; centerline-to-centerline), and width w generally comparable to that of the tubes 22 (e.g., 0.03 inch to 0.3 inch or about 0.09 inch)) disposed between adjacent tubes 22 provide structural support for the network of tubes 22 and direct the gas 12 through the heat transfer regions 150, 250 (i.e., through open areas in the heat transfer regions 150, 250 defined by the tubes 22 and the fins 24). The cooling fins 24 and the tubes 22 have thicknesses of $t_1$ and $t_2$, respectively (e.g., independently ranging from 0.005 inch to 0.05 inch or about 0.018 inch). Thus, the first and second heat transfer regions 150, 250 include a plurality of the tubes 22 extending longitudinally between and in fluid communication with their respective headers 130, 140, 230, and 240 (e.g., via openings in header sidewalls allowing fluid to exit/enter the tubes 22 from the headers). Similarly, the first and second heat transfer regions 150, 250 also include a plurality of the corrugated fins 24 between adjacent tubes 22. The tubes 22 and the fins 24 generally can be formed from any convenient (highly) thermally conductive material that permits rapid conductive heat transfer from the hot fluid 14 through the walls of the tubes 22 and the fins 24 to promote rapid convective heat transfer to the cold air 12. Suitable materials can include metals with a high thermal conductivity such as aluminum. As illustrated in FIG. 5, the headers 130, 140, 230, and 240 are elongate reservoirs that extend in a direction substantially perpendicular to a longitudinal direction defined by the tubes 22. In an embodiment, the fins 24 and the tubes 22 of the second heat exchanger 200 are substantially aligned with corresponding fins 24 and tubes 22 in the first heat exchanger 100.

The heat exchanger apparatus 10 is suitably configured such that, in use, the flow of the fluid 14 through the first and second heat exchangers 100, 200 can be assisted by gravity. As illustrated in FIG. 5, the first inlet header 130 can have an inlet port 110 at or near one end of the header and the first outlet header 140 can have an outlet port 120 at or near an opposing end of the header. When the heat exchanger apparatus 10 is oriented such that the inlet port 110 has a higher elevation than the outlet port 120, fluid 14 fed to the apparatus 10 will be at least partially driven by gravity through the apparatus 10. Although single inlet and outlet ports 110, 120 are provided in the illustrated embodiment (e.g., because the fluid 14 is partitioned between the two heat exchangers 100, 200 via the bypass conduit 114 and the opening 144), additional inlet and outlet ports may be included on either the first and/or second headers (e.g., in which case the bypass conduit 114 and/or the opening 144 can be omitted in certain embodiments).

Suitably, at least one of the headers 130, 140, 230, and 240 can include at least one internal baffle. The baffle partitions its respective header into two or more portions that are internally isolated from each other but which remain in fluid communication via the opposing header and the intervening tubes/heat transfer region, thereby creating a multi-pass fluid flow path through the tubes of the first or second heat exchanger 100, 200.

For example, as illustrated in FIG. 5, the first inlet header 130 has an internal baffle 132 that partitions the first inlet header 130 into two portions 130a, 130b that are internally isolated from each other but which remain in fluid communication via the first outlet header 140 (e.g., portion 140a thereof) and the tubes 22 of the first heat transfer region 150. Similarly, the first outlet header 140 has an internal baffle 142 that partitions the first outlet header 140 into two portions 140a, 140b that are internally isolated from each other but which remain in fluid communication via the first inlet header 130 (e.g., portion 130b thereof) and the tubes 22 of the first heat transfer region 150. Thus, the internal baffles 132, 142 form a multi-pass flow path for the fluid 14 flowing through the tubes 22 of the first heat exchanger 100. In the illustrated embodiment, a portion of the fluid 14 entering the top portion 130*a* of the inlet header 130 via inlet port 110 (i) travels through the tubes 22 to the top portion 140*a* of the outlet header 140, (ii) travels downward within the portion 140*a* and returns through the tubes 22 to the bottom portion 130*b* of the inlet header 130, and (iii) similarly travels downward within the portion 130*b* and returns through the tubes 22 to the bottom portion 140*b* of the outlet header 140 prior to exiting the apparatus 10 via the outlet port 120. Thus, the first heat exchanger 100 has a three-pass flow path for the fluid 14 flowing through the tubes 22 of the first heat exchanger 100. While the illustrated second heat exchanger 200 has a single-pass flow path for the fluid 14 flowing through the tubes 22 of the second heat exchanger 200 based on the absence of any internal baffles in the headers 230, 240, such baffles can be included to create a multi-pass flow path in the second heat exchanger 200 as well.

Figure 8:
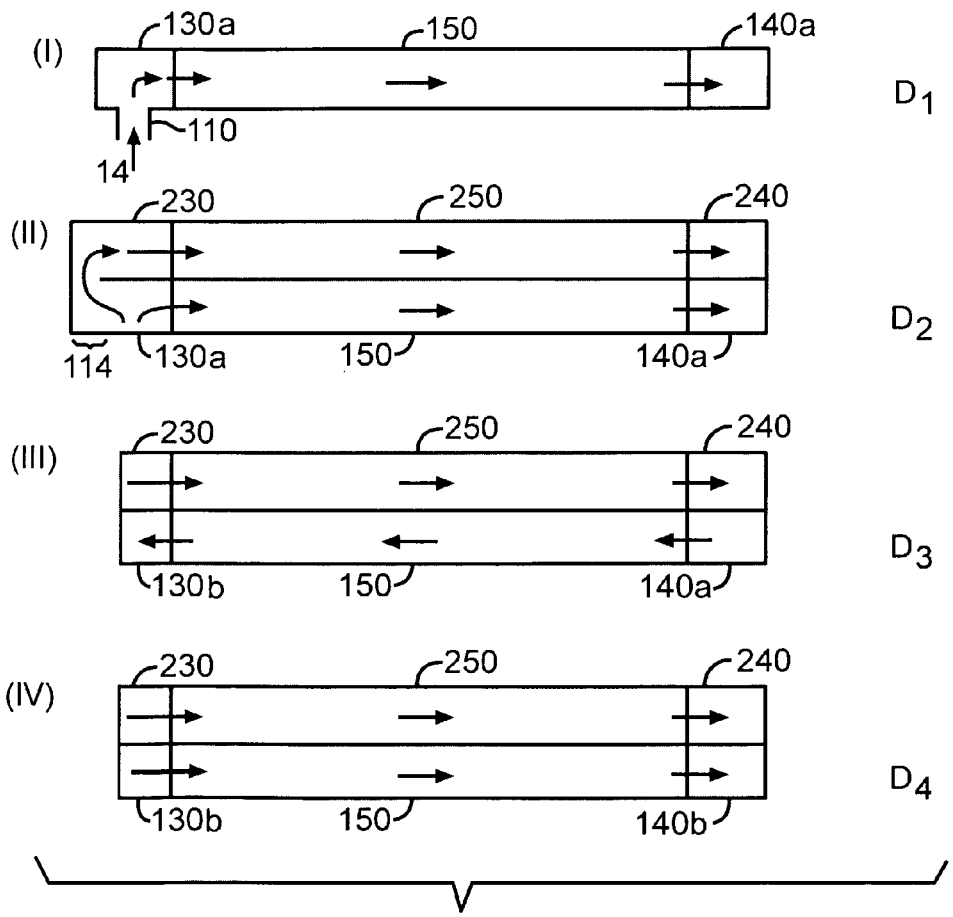
FIG. 8 illustrates cross sections (I-IV) of the heat exchanger apparatus of FIG. 5 along with lines showing representative flow paths of fluid through the heat exchanger apparatus. (Lines/arrows indicate direction of fluid flow.)

The foregoing 3-pass/1-pass embodiment is illustrated in more detail in FIG. 8, where views I-IV correspond to the sections D1-D4 at differing elevations in FIG. 5(VI). As shown in views II-IV of FIG. 8, all of the fluid 14 in the second heat exchanger 200 flows through the second heat transfer region 250 in a forward-flow configuration. In contrast, the fluid 14 in the first heat exchanger 100 flows through the first heat transfer region 150 first in a forward direction (views I and II), then in a reverse direction (III), and finally in a forward direction (IV) before exiting the apparatus 10.

In the embodiment illustrated in FIG. 5, an oil cooler 146 can be included in the first outlet header 140. Hot engine oil fed the oil cooler 146 is cooled by the fluid 14 passing through the first outlet header 140.

Heat Exchanger Use and Performance

The heat exchanger apparatus 10, in any of its variously disclosed embodiments, can be used in a method for exchanging heat between the first fluid 14 and the gas 12. In general: (i) the fluid 14 is fed at a first temperature to the first inlet header 130 and/or the second inlet header 230, thereby causing the fluid 14 to flow through the first inlet header 130, second inlet header 230, tubes 22 of the first heat transfer region 150, tubes 22 of the second heat transfer region 250, first outlet header 140, and second outlet header 240; (ii) the gas 12 is delivered in a direction from the second heat exchanger 200 to the first heat exchanger 100 and substantially perpendicular to a longitudinal direction defined by the tubes 22 of the heat transfer regions 150, 250, thereby exchanging heat between the gas 12 and the fluid 14 in the tubes 22; and (iii) the fluid 14 is recovered at a second temperature (shown as fluid 15) from the first outlet header 140 and/or the first outlet header 240.

With respect to the specific embodiment illustrated in FIGS. 5-8, the gas 12 (e.g., cold ambient air for cooling hot engine cooling fluid) enters the heat exchanger apparatus 10 by first contacting the second heat exchanger 200, passing to the first heat exchanger 100, and then exiting the heat exchanger apparatus 10 as an exhaust gas 13 (e.g., ambient air heated by the engine cooling fluid). The fluid 14 (e.g., hot engine coolant fluid from the engine coolant system 72) enters the top portion 130*a* of the first inlet header 130 via the inlet port 110. The fluid 14 is partitioned in top portion 130*a* by the bypass conduit 114 such that a portion of the fluid 14 enters the second inlet header 230 and a portion of the fluid 14 enters the tubes 22 of the first heat transfer region 150 in fluid communication with the top portion 130*a*. The fluid 14 suitably is partitioned such that a majority of the fluid 14 ultimately passes through the second heat exchanger 200 (e.g., 50% to 80% or 55% to 70% of the fluid 14 passes through the second heat exchanger 200 and 20% to 50% or 30% to 45% of the fluid 14 passes through the first heat exchanger 100). As described above, once in the first heat transfer region 150, the fluid 14 travels through the tubes 22 to the top portion 140*a* of the outlet header 140, returns through the tubes 22 to the bottom portion 130*b* of the inlet header 130, and travels through the tubes 22 to the bottom portion 140*b* of the outlet header 140. The fluid 14 entering the second inlet header 230 enters the tubes 22 of the second heat transfer region 250 and travels through the tubes 22 to the outlet header 240. The fluid 14 in the outlet header 240 and the bottom portion 140*b* of the outlet header 140 recombines via the opening 144 in the bottom portion 140*b* before exiting the apparatus 10 via the outlet port 120 as the cooled fluid 15.

In the disclosed motor vehicle 50 setting (e.g., described above), the heat exchanger apparatus 10 has a cooling capacity for engine coolant fluid ranging from 100,000 BTU/hr to 500,000 BTU/hr (e.g., at least 100,000 BTU/hr, 150,000 BTU/hr, 200,000 BTU/hr and/or up to 300,000 BTU/hr, 400,000 BTU/hr, 500,000 BTU/hr, such as about 250,000 BTU/hr) when using ambient cooling air. Any engine coolant fluids commonly known and used in vehicles of varying sizes can be used. Suitable coolant fluids can include water, a glycol (e.g., ethylene glycol and/or propylene glycol), and typical coolant additives (e.g., corrosion inhibitors, lubricants, buffers, and/or dyes; at a level up to about 5 wt. % or 5 vol. % relative to the base water/glycol mixture), for example including a 50/50 mixture of ethylene glycol and water that can further include any of the desired additives. Suitable closed-loop flow rates for the engine coolant fluid in the engine coolant system 72 range from 50 gpm to 300 gpm (e.g., 100 gpm to 200 gpm or about 135 gpm). The cooling air can be from a hot external environment (e.g., at least 100° F. or 110° F. and/or up to 120° F. or 130° F.) while still being capable of maintaining the vehicle engine at a temperature sufficiently low to prevent damage to the engine (e.g., ranging from the cooling air inlet temperature up to 195° F., 220° F., or 250° F.). For example, the temperature of the (hot) fluid 14 entering the apparatus 10 suitably ranges from 210° F. to 230° F., and the temperature of the (cooled) fluid 15 exiting the apparatus 10 is lower, suitably ranging from 190° F. to 210° F. Accordingly, the $\Delta T$ (e.g., inlet temperature minus outlet temperature) of the fluid 14/15 passing through the apparatus 10 suitably ranges from 5° F. to 40° F. (e.g., 10° F. to 30° F., 15° F. to 25° F., 20° F.), although the absolute temperatures of the fluid 14/15 will vary based on engine temperature, ambient outdoor temperature, and net vehicle weight (i.e., including cargo or other carried loads). Alternatively, the heat exchanger apparatus 10 (in either the vehicle 50 or other setting) can be characterized in terms of its specific cooling capacity (e.g., for an engine coolant-air or other heat exchange system) expressed as a cooling rate per unit of cross sectional area available for cooling gas flow and substantially perpendicular to the cooling gas flow during use (e.g., cross sectional area A illustrated in FIG. 5). Suitably, the specific cooling capacity can range from 200 BTU/(hr·in$^2$) to 2,000 BTU/(hr·in$^2$) (e.g., at least 200, 300, 400, or 500 BTU/(hr·in$^2$) and/or up to 800, 1000, or 2000 BTU/(hr·in$^2$), such as about 600 BTU/(hr·in$^2$)).

Because other modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clarity of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations expressed as a percent are weight-percent (% w/w), unless otherwise noted. Numerical values and ranges can represent the value/range as stated or an approximate value/range (e.g., modified by the term "about"). Combinations of components are contemplated to include homogeneous and/or heterogeneous mixtures, as would be understood by a person of ordinary skill in the art in view of the foregoing disclosure.

What is claimed is:

1. A heat exchanger apparatus comprising:
   (a) a first heat exchanger for performing heat exchange between a fluid and a gas, the first heat exchanger comprising:
      (i) a plurality of first tubes through which the fluid can flow,
      (ii) a plurality of first fins disposed between adjacent first tubes,
      (iii) a first inlet header in fluid communication with the first tubes at first longitudinal ends of the first tubes, and
      (iv) a first outlet header in fluid communication with the first tubes at second longitudinal ends of the first tubes;
   (b) a second heat exchanger for performing heat exchange between the fluid and the gas, the second heat exchanger being mounted adjacent to the first heat exchanger and comprising:
      (i) a plurality of second tubes through which the fluid can flow,
      (ii) a plurality of second fins disposed between adjacent second tubes,
      (iii) a second inlet header in fluid communication with (A) the second tubes at first longitudinal ends of the second tubes and optionally (B) the first inlet header, and
      (iv) a second outlet header in fluid communication with (A) the second tubes at second longitudinal ends of the second tubes and optionally (B) the first outlet header;
   wherein:
      (i) the second heat exchanger is disposed on an upstream gas side of the first heat exchanger;
      (ii) the first heat exchanger and the second heat exchanger are configured to permit a gas flow in a direction from (A) the second heat exchanger and over the second tubes and the second fins thereof to (B) the first heat exchanger and over the first tubes and the first fins thereof in use to provide heat exchange between the fluid and the gas; and
      (iii) the first heat exchanger and the second heat exchanger are arranged in a parallel configuration to allow a stream of fluid to be separated into two discrete streams of fluid, each of which passes through only one of the first heat exchanger and the second heat exchanger before recombining with the other discrete stream of fluid and exiting the apparatus.

2. The apparatus of claim 1, wherein:
   (i) the second inlet header is in fluid communication with the first inlet header; and
   (ii) the second outlet header is in fluid communication with the first outlet header.

3. The apparatus of claim 1, further comprising:
   (c) a bypass conduit between the first inlet header and the second inlet header, the bypass conduit placing the first inlet header in fluid communication with the second inlet header, thereby (i) permitting a portion of the fluid in the first inlet header to enter the second inlet header and (ii) permitting a portion of the fluid in the first inlet header to enter the first tubes.

4. The apparatus of claim 1, wherein an interior wall of the first outlet header and an interior wall of the second outlet header together define an opening placing the first outlet header in fluid communication with the second outlet header, thereby permitting a portion of the fluid in the first outlet header to mix with a portion of the fluid in the second outlet header prior to exiting the apparatus.

5. The apparatus of claim 1, wherein at least one of the first or second inlet or outlet headers comprises at least one internal baffle, the baffle partitioning the header into two or more portions that are internally isolated from each other but which remain in fluid communication via the opposing header and the intervening tubes, thereby creating a multi-pass fluid flow path through the tubes of the first or second heat exchanger.

6. The apparatus of claim 5, wherein:
   (i) the first inlet header comprises a first inlet internal baffle that partitions the first inlet header into two portions that are internally isolated from each other but which remain in fluid communication via the first outlet header and the first tubes;
   (ii) the first outlet header comprises a first outlet internal baffle that partitions the first outlet header into two portions that are internally isolated from each other but which remain in fluid communication via the first inlet header and the first tubes; and
   (iii) the first inlet internal baffle and the first outlet internal baffle form a multi-pass flowpath for the fluid flowing through the first tubes of the first heat exchanger.

7. A heat exchanger apparatus comprising:
   (a) a first heat exchanger for performing heat exchange between a fluid and a gas, the first heat exchanger comprising:
      (i) a plurality of first tubes through which the fluid can flow,
      (ii) a plurality of first fins disposed between adjacent first tubes,
      (iii) a first inlet header in fluid communication with the first tubes at first longitudinal ends of the first tubes, and
      (iv) a first outlet header in fluid communication with the first tubes at second longitudinal ends of the first tubes;
   (b) a second heat exchanger for performing heat exchange between the fluid and the gas, the second heat exchanger being mounted adjacent to the first heat exchanger and comprising:
      (i) a plurality of second tubes through which the fluid can flow,
      (ii) a plurality of second fins disposed between adjacent second tubes,
      (iii) a second inlet header in fluid communication with (A) the second tubes at first longitudinal ends of the second tubes and optionally (B) the first inlet header, and (iv) a second outlet header in fluid communication with (A) the second tubes at second longitudinal ends of the second tubes and optionally (B) the first outlet header;

wherein:
(i) the second heat exchanger is disposed on an upstream gas side of the first heat exchanger; and
(ii) the first heat exchanger and the second heat exchanger are configured to permit a gas flow in a direction from (A) the second heat exchanger and over the second tubes and the second fins thereof to (B) the first heat exchanger and over the first tubes and the first fins thereof in use to provide heat exchange between the fluid and the gas;

wherein at least one of the first or second inlet or outlet headers comprises at least one internal baffle, the baffle partitioning the header into two or more portions that are internally isolated from each other but which remain in fluid communication via the opposing header and the intervening tubes, thereby creating a multi-pass fluid flow path through the tubes of the first or second heat exchanger;

wherein:
(i) the first inlet header comprises a first inlet internal baffle that partitions the first inlet header into two portions that are internally isolated from each other but which remain in fluid communication via the first outlet header and the first tubes;
(ii) the first outlet header comprises a first outlet internal baffle that partitions the first outlet header into two portions that are internally isolated from each other but which remain in fluid communication via the first inlet header and the first tubes; and
(iii) the first inlet internal baffle and the first outlet internal baffle form a multi-pass flowpath for the fluid flowing through the first tubes of the first heat exchanger; and wherein the second heat exchanger has a single-pass flow path for the fluid flowing through the second tubes of the second heat exchanger.

8. The apparatus of claim 7, wherein:
(i) the first inlet internal baffle partitions the first inlet header into a first inlet header portion and a second inlet header portion;
(ii) the first outlet internal baffle partitions the first outlet header into a first outlet header portion and a second outlet header portion;
(iii) the first inlet header portion is in fluid communication with the second inlet header portion via the first outlet header portion and the first tubes;
(iv) the first outlet header portion is in fluid communication with the second outlet header portion via the second inlet header portion and the first tubes; and
(v) the first heat exchanger has a three-pass flow path for the fluid flowing through the first tubes of the first heat exchanger.

9. The apparatus of claim 7, wherein the second fins and the second tubes of the second heat exchanger are substantially aligned with corresponding first fins and first tubes in the first heat exchanger.

10. The apparatus of claim 7, wherein:
(i) the first inlet header and the first outlet header extend in a direction substantially perpendicular to a longitudinal direction defined by the first tubes; and
(ii) the second inlet header and the second outlet header extend in a direction substantially perpendicular to a longitudinal direction defined by the second tubes.

11. The apparatus of claim 10, wherein:
(i) the first inlet header comprises an inlet port;
(ii) the first outlet header comprises an outlet port; and
(iii) the inlet port and outlet port are located at opposing ends of their respective headers, thereby permitting gravity-assisted flow of the fluid through the first and second heat exchangers.

12. The apparatus of claim 7, further comprising:
(c) a fan assembly disposed on an upstream gas side of the first heat exchanger, the fan assembly being capable of delivering a gas flow in a direction from the second heat exchanger to the first heat exchanger and substantially perpendicular to a longitudinal direction defined by the first tubes and the second tubes.

13. The apparatus of claim 12, further comprising:
(d) a third heat exchanger for performing heat exchange between a second fluid and the gas, the third heat exchanger being interposed between the second heat exchanger and the fan assembly.

14. A method for exchanging heat between a fluid and a gas, the method comprising:
(a) providing a heat exchanger apparatus according to claim 7;
(b) feeding a fluid at a first temperature to the first inlet header and the second inlet header, thereby causing fluid to flow through the first inlet header, the second inlet header, the first tubes, the second tubes, the first outlet header, and the second outlet header;
(c) delivering a gas flow in a direction from the second heat exchanger to the first heat exchanger and substantially perpendicular to a longitudinal direction defined by the first tubes and the second tubes, thereby exchanging heat between the gas and the fluid in the first tubes and the second tubes; and
(d) recovering the fluid at a second temperature from the first outlet header and the second outlet header.

15. The method of claim 14, wherein:
(i) the fluid is an engine coolant fluid comprising water and a glycol;
(ii) the gas is air; and
(iii) the first temperature of the fluid is higher than the second temperature of the fluid.

16. The method of claim 15, wherein:
(i) the heat exchanger apparatus is mounted in an engine compartment of a vehicle, the vehicle comprising a vehicle engine mounted in the engine compartment and an engine cooling system in fluid communication with the vehicle engine;
(ii) the first and second heat exchangers of the heat exchanger apparatus are in fluid communication with the engine cooling system; and
(iii) part (d) further comprises cooling the vehicle engine with the fluid recovered at the second temperature.

17. A motorized vehicle comprising:
(a) a vehicle body having (i) a front end, (ii) a rear end, and (iii) an engine compartment disposed toward the front end;
(b) a vehicle engine mounted in the engine compartment;
(c) an engine cooling system mounted to the vehicle body and in fluid communication with the vehicle engine;
(d) optionally, an air conditioning system mounted to the vehicle body;
(e) a heat exchanger apparatus according to claim 7 mounted in the engine compartment and located to receive an external convective cooling air flow when the motorized vehicle moves in a forward direction;

wherein:
(i) the first and second heat exchangers of the heat exchanger apparatus are in fluid communication with the engine cooling system; and
(ii) the third heat exchanger of the heat exchanger apparatus, when present, is in fluid communication with the air conditioning system.

18. The motorized vehicle of claim 17, wherein the motorized vehicle is an armored fighting vehicle (AFV).

19. The motorized vehicle of claim 17, wherein the motorized vehicle is a wheeled armored fighting vehicle (AFV).

20. The motorized vehicle of claim 17, wherein the motorized vehicle has a vehicle weight of at least 5,000 lb.

21. The motorized vehicle of claim 17, wherein the heat exchanger apparatus is capable of maintaining the vehicle engine at an engine temperature less than 250° F. when external cooling air has an ambient temperature up to 130° F.

22. The motorized vehicle of claim 17, wherein the heat exchanger apparatus is capable of maintaining the vehicle engine at an engine temperature less than 195° F. when external cooling air has an ambient temperature up to 130° F. and the motorized vehicle has a test weight of about 10,000 lb.

23. The motorized vehicle of claim 17, wherein the heat exchanger apparatus has a cooling capacity for engine coolant fluid ranging from about 100,000 BTU/hr to about 500,000 BTU/hr.

24. The motorized vehicle of claim 17, wherein the heat exchanger apparatus has a specific cooling capacity for engine coolant fluid ranging from about 200 BTU/(hr·in$^2$) to about 2,000 BTU/(hr·in$^2$) relative to a cross-sectional area available for cooling air flow and substantially perpendicular to the cooling air flow direction during use.

25. The motorized vehicle of claim 17, further comprising a shroud mounted on a downstream air side of the heat exchanger apparatus.

* * * * *